(12) United States Patent
Singh et al.

(10) Patent No.: US 9,763,130 B1
(45) Date of Patent: Sep. 12, 2017

(54) SYSTEMS AND METHODS FOR MANAGING CONGESTION IN A WIRELESS COMMUNICATION NETWORK

(71) Applicant: Sprint Spectrum LP, Overland Park, KS (US)

(72) Inventors: Jasinder Singh, Olathe, KS (US); Saravana Velusamy, Olathe, KS (US); Suryanarayanan Ramamurthy, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 55 days.

(21) Appl. No.: 14/554,222

(22) Filed: Nov. 26, 2014

(51) Int. Cl.
*H04W 72/04* (2009.01)
*H04W 28/02* (2009.01)
*H04W 28/08* (2009.01)

(52) U.S. Cl.
CPC ... *H04W 28/0205* (2013.01); *H04W 28/0268* (2013.01); *H04W 28/0289* (2013.01); *H04W 28/085* (2013.01); *H04W 72/0493* (2013.01)

(58) Field of Classification Search
None
See application file for complete search history.

(56) References Cited

U.S. PATENT DOCUMENTS

| 2009/0196213 | A1* | 8/2009 | Zhong | H04W 36/06 370/312 |
| 2012/0002614 | A1 | 1/2012 | Ekici et al. | |
| 2012/0020345 | A1* | 1/2012 | Zhou | H04L 12/14 370/338 |
| 2012/0246325 | A1* | 9/2012 | Pancorbo Marcos | H04L 12/2602 709/227 |
| 2012/0320743 | A1* | 12/2012 | De Roucy | H04L 41/0893 370/230 |
| 2013/0223222 | A1 | 8/2013 | Kotecha et al. | |
| 2014/0003297 | A1 | 1/2014 | Uusitalo et al. | |

* cited by examiner

*Primary Examiner* — Omar Ghowrwal
*Assistant Examiner* — Angel Brockman
(74) *Attorney, Agent, or Firm* — Jones Robb, PLLC (57) ABSTRACT

Systems and methods are described for assigning a profile to a wireless device in a communication network. Usage data associated with a wireless device may be received at a first access node. A first bearer profile may be assigned to a data transmission path. The usage data may be monitored for a set of criteria for a predetermined time period. A second bearer profile may be assigned to the data transmission path based on the usage data associated with the wireless device when the set of criteria is met. The wireless device may be detached from the communication network. The wireless device may be updated with the second bearer profile.

14 Claims, 5 Drawing Sheets

SYSTEMS AND METHODS FOR MANAGING CONGESTION IN A WIRELESS COMMUNICATION NETWORK

TECHNICAL BACKGROUND

Telecommunication systems, such as cellular networks or other wireless networks, use wireless signals to establish communication channels between various network devices. For example, an access node or "cell" may transmit a reference signal or a pilot signal over a signal radius and one or more wireless devices within the signal radius may attempt to establish a connection with the access node. Nowadays, many wireless devices are designed to perform tasks beyond voice communications and wireless networks must support multi-play applications of voice, video, and data on a single infrastructure and carry multi-play services that share radio access and core network resources. These converged services each have unique traffic-handling, Quality of Experience (QoE), and Quality of Service (QoS) requirements.

In certain circumstances, a portion of the wireless network may experience a high load. For instance, an access node may become overloaded with, for example, large amounts of data traffic or too many wireless devices. When this happens, the network may take actions that help prevent a noticeable degradation in the QoE and QoS being provided to users. These actions can include "load balancing" which redistributes work among network elements and across frequency bands in order to help prevent degraded or lost service and implementation of various congestion management techniques.

OVERVIEW

Systems and methods are described for assigning a bearer profile to a wireless device operating in a communication network. In one instance, usage data associated with a wireless device in a connected mode may be received at a network node and the network node may assign a first bearer profile to the connected wireless device. The usage data may be monitored for a set of criteria for a predetermined time period. A second bearer profile may be assigned to the wireless device by the network node when the set of criteria is met. The wireless device may be detached from the communication network. The network node may send the second bearer profile to the wireless device.

DETAILED DESCRIPTION

Figure 1:
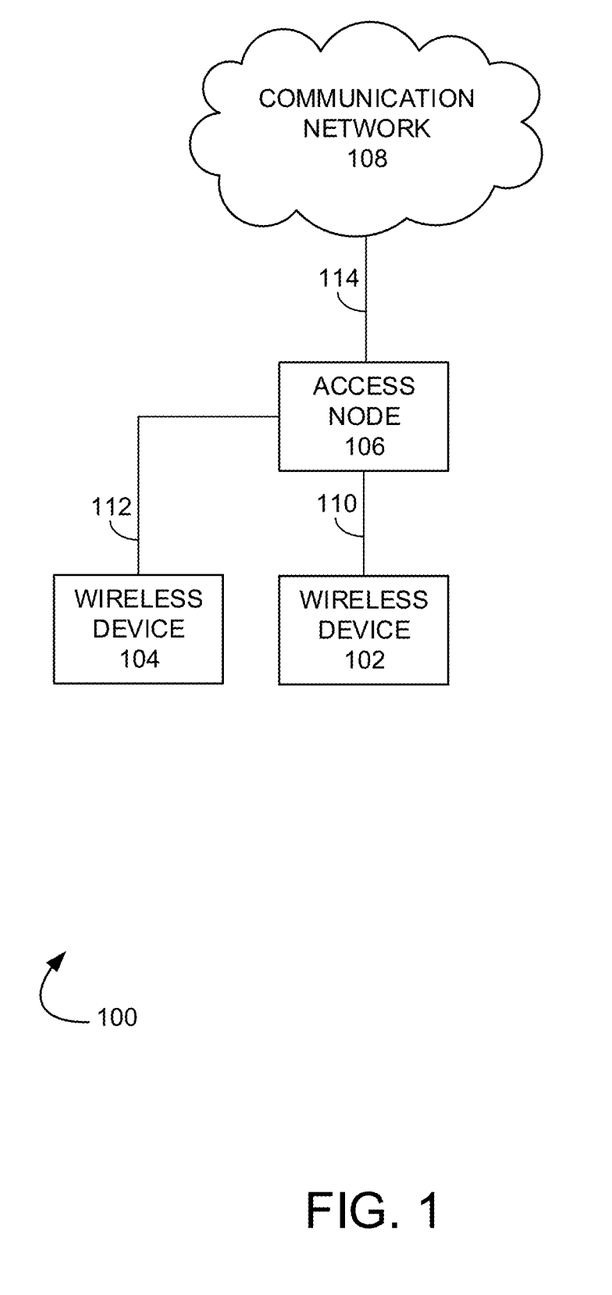
FIG. 1 illustrates an exemplary communication system for assigning a bearer profile to a wireless device operating in a communication network.

FIG. 1 illustrates an exemplary communication system 100 for assigning a bearer profile to a wireless device operating in a communication network. Communication system 100 can comprise wireless devices 102, 104, access node 106, and communication network 108. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 106 and communication network 108 which are omitted for clarity, including additional processing nodes, routers, gateways, and physical and/or wireless data links for carrying data among the various network elements.

Wireless devices 102, 104 can be any device configured to communicate over system 100 using a wireless communication link. For example, wireless devices 102, 104 can include a cell phone, a smart phone, a computing platform such as a laptop, palmtop, or a tablet, a personal digital assistant, or an internet access device, and combinations thereof. It is noted that while two wireless devices are illustrated in FIG. 1 as being in communication with access node 106, any number of wireless devices can be implemented according to various exemplary embodiments disclosed herein.

Wireless devices 102, 104 can transmit and/or receive information over system 100 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music MP3's, ring tones, stock tickers, new alerts, etc.

Access node 106 can be any network node configured to provide communication between wireless devices 102, 104 and communication network 108. Access node 106 can be short range access nodes or standard access nodes. A short range access node could include a microcell base station, a picocell base station, a femtocell base station, or the like. A standard access node could include a base transceiver station, a radio base station, a NodeB device, or an enhanced NodeB (eNodeB) device, or the like. It is noted that while one access node 106 is illustrated in FIG. 1, any number of access nodes can be implemented within system 100.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying data, for example, to support voice, push-to-talk, broadcast video, and data communications by a wireless device, for example, wireless device 102. Wireless network protocols can comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 108 comprise Ethernet, Fast Ethernet, Gigabit Ethernet, Local Talk (such as Carrier Sense multiple Access with Collision Avoidance), Token Ring, Fiber Distributed Data Interface (FDDI), and Asynchronous Transfer Mode (ATM). Communication network 108 can also comprise additional base stations, controller nodes, telephony switches, internet routers, network gateways, computer systems, communication links, or some other type of communication equipment, and combinations thereof.

Communication links 110, 112, 114 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 110, 112, 114 can be a direct link or might include various equipment, intermediate components, systems, and networks.

Figure 2:
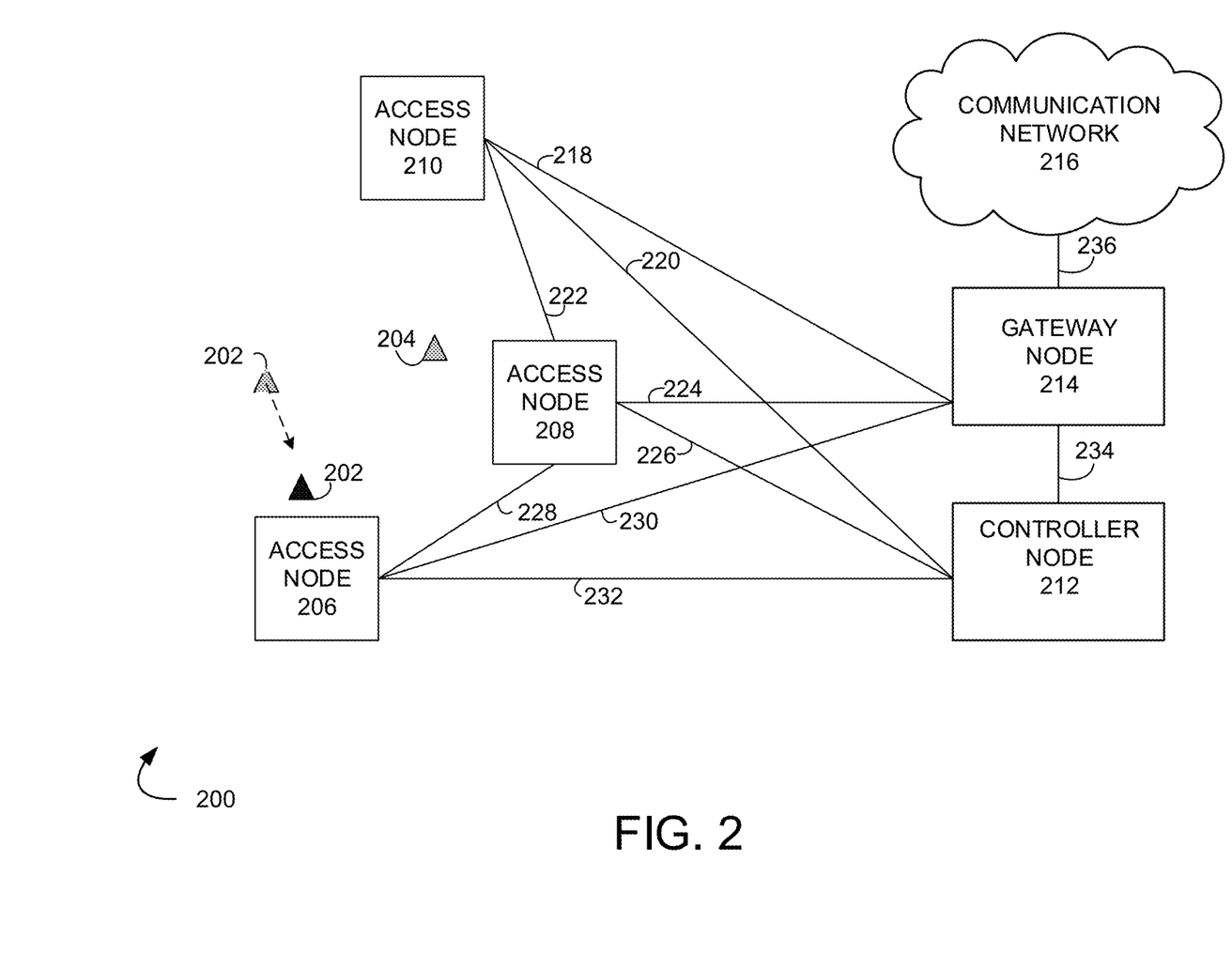
FIG. 2 illustrates another exemplary communication system for assigning a bearer profile to a wireless device operating in a communication network.

FIG. 2 illustrates an exemplary communication system 200 for assigning a bearer profile to a wireless device operating in a wireless communication network. Communication system 200 can comprise wireless devices 202, 204, access nodes 206, 208, 210, controller node 212, gateway node 214, and communication network 216. Other network elements may be present in the communication system 200 to facilitate communication but are omitted for clarity, such as base stations, base station controllers, gateways, mobile switching centers, dispatch application processors, and location registers such as a home location register or visitor location register. Furthermore, other network elements may be present to facilitate communication, such as between access nodes 206, 208, 210 and communication network 216, which are omitted for clarity, including additional processing nodes, routers, gateways, and physical and/or wireless data links for carrying data among the various network elements.

Wireless devices 202, 204 can be any device configured to communicate over communication system 200 using a wireless interface. For example, wireless devices 202, 204 can include a remote terminal unit, a cell phone, a smart phone, a computing platform such as a laptop, palmtop, or a tablet, a personal digital assistant, or an internet access device, and combinations thereof.

The wireless interface of wireless devices 202, 204 can include one or more transceivers for transmitting and receiving data over communication system 200. Each transceiver can be associated with the same or different frequency bands, the same or different radio access technologies, the same or different network providers, and/or the same or different services. For example, wireless devices 202, 204 can include a transceiver that is associated with one or more of the following: code division multiple access (CDMA), global system for mobile communications (GSM), worldwide interoperability for microwave access (WiMAX), long-term evolution (LTE), and/or high-speed downlink packet access (HSDPA), IEEE 802.11, wireless fidelity (Wi-Fi), Bluetooth, Zigbee, infrared data association (IrDA), multimedia broadcast multicast service (MBMS), etc.

While not illustrated in FIG. 2 for clarity, wireless devices 202, 204 can be in communication with access nodes 206, 208, 210 through communication links. The communication links can use various communication media, such as air, space, metal, optical fiber, or some other signal propagation path—including combinations thereof. The communication links may comprise many different signals sharing the same link. The communication links could include multiple signals operating in a single "air path" comprising beacon signals, user communications, communication sessions, overhead communications, frequencies, timeslots, transportation ports, logical transportation links, network sockets, packets, or communication directions. For example, user communication between wireless device 202 and access node 206 could share the same representative wireless link, but be transferred over different communication sessions, frequencies, timeslots, packets, ports, sockets, logical transport links, or in different directions—including combinations thereof.

Wireless devices 202, 204 can transmit and/or receive information over communication system 200 using various communication services. These services can include various voice, data, and/or MBMS services and applications. For example, mobile voice services, mobile data services, push-to-talk services, internet services web browsing, email, pictures, picture messaging, video, video messaging, broadcast video, audio, voicemail, music, MP3's, ring tones, stock tickers, new alerts, etc.

Access nodes 206, 208, 210 can be any network node configured to provide communication between wireless devices 202, 204 and communication network 216. Access nodes 206, 208, 210 can be standard access nodes or short range, low power access nodes. In an exemplary embodiment, access nodes 206, 210, for example, can be within at least a portion of an overlapping coverage area of access node 206 where each access node 206, 208, 210 has a coverage area that includes a cell edge portion (not shown) between the full strength coverage area and the edge of the cell coverage area.

A standard access node can be a macrocell access node such as a base transceiver station, a radio base station, a NodeB device, or an enhanced NodeB (eNodeB) device, or the like. A short range access node can include a microcell base station, a picocell base station, a femtocell base station, or the like such as a home NodeB or a home eNodeB device. In addition, a wireless device configured to enter a hotspot mode can be a femtocell access node. It is noted that while three access nodes 206, 208, 210 are illustrated in FIG. 2, any number of access nodes can be implemented within system 200.

Access nodes 206, 208, 210 can comprise a processor and associated circuitry to execute or direct the execution of computer-readable instructions to obtain information. Access nodes 206, 208, 210 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 206, 208, 210 can receive instructions and other input at a user interface.

Controller node 212 can be any network node configured to communicate information and/or control information over communication system 200. Controller node 212 can be configured to transmit control information associated with a handover procedure. Controller node 212 can be a stand-alone computing device, computing system, or network component, and can be accessible, for example, by a wired or wireless connection, or through an indirect connection such as through a computer network or communication network. For example, controller node 212 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 212 is not limited to any specific technology architecture, such as Long Term Evolution (LTE) and can be used with any network architecture and/or protocol.

Controller node 212 can comprise a processor and associated circuitry to execute or direct the execution of computer-readable instructions to obtain information. Controller node 212 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers' network interfaces, applications, or some other type of software, including combinations thereof. Controller node 212 can receive instructions and other input at a user interface.

Gateway node 214 can be any network node configured to interface with other network nodes using various protocols that communicates, routes, and forwards communication data addressed to a wireless device 202, 204. In addition, gateway node 214 can act as a mobility anchor for wireless devices 202, 204 during handovers between different frequencies and/or different radio access technologies supported by the same access node. Gateway node 214 can be a standalone computing device, computing system, or network component, and can be accessible, for example, by a wired or wireless connection, or through an indirect connection such as through a computer network or communication network. For example, gateway node 214 can include a serving gateway (SGW) and/or public data network gateway (PGW), etc. One of ordinary skill in the art would recognize that gateway node 214 is not limited to any specific technology architecture, such as Long Term Evolution (LTE) and can be used with any network architecture and/or protocol.

Gateway node 214 can comprise a processor and associated circuitry to execute or direct the execution of computer-readable instructions to obtain information. Gateway node 214 can retrieve and execute software from storage, which can include a disk drive, a flash drive, memory circuitry, or some other memory device, and which can be local or remotely accessible. The software comprises computer programs, firmware, or some other form of machine readable instructions, and may include an operating system, utilities, drivers, network interfaces, applications, or some other type of software, including combinations thereof. Gateway node 214 can receive instructions and other input at a user interface.

Access node 206 can be in communication with controller node 212 through communication link 232, gateway node 214 through communication link 230, and access node 208 through communication link 228. Access node 208 can be in communication with controller node 212 through communication link 226, gateway node 214 through communication link 224, and access node 210 through communication link 222. Access node 210 can be in communication with controller node 212 through communication link 220 and gateway node 214 through communication link 218. Gateway node 214 can be in communication with controller node 212 through communication link 234 and with communication network 216 through communication link 236.

Communication links 218, 220, 222, 224, 226, 228, 230, 232, 234, 236 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Communication links 218, 220, 222, 224, 226, 228, 230, 232, 234, 236 can be a direct link or might include various equipment, intermediate components, systems, and networks.

Communication network 216 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 216 can be capable of carrying data, for example, to support voice, push-to-talk, broadcast video, and data communications by a wireless device, such as wireless devices 202. Wireless network protocols can comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 216 comprise Ethernet, Fast Ethernet, Gigabit Ethernet, Local Talk (such as Carrier Sense Multiple Access and Collision Avoidance), Token Ring, Fiber Distributed Data Interface (FDDI), and Asynchronous Transfer Mode (ATM). Communication network 216 can also comprise additional base stations, controller nodes, telephony switches, internet routers, network gateways, computer systems, communication links, or some other type of communication equipment, and combinations thereof.

Referring to FIG. 2, in operation, bearers (not shown) can enable differential treatment for data traffic services with varying Quality of Service (QoS) requirements. For example, bearers provide a logical, edge-to-edge transmission path for multi-play applications, such as voice, video, data, etc., with defined QoS parameters between wireless device 202, 204 and access node 206, 208, 210. The QoS parameters may include, for example, a QoS Class Indicator (QCI) level, an Allocation and Retention Priority (ARP) value, Guaranteed Bit Rate (GBR), Maximum Bit Rate (MBR), etc., and may be implemented using transport protocols that correspond to specific bearer interfaces, e.g., radio bearers, S1 bearers, S5/S8 bearers, etc.

In an exemplary embodiment, gateway node 214 via access node 206, 208, 210 may specify a QCI level for multi-play applications, e.g., voice, video, data, etc., requested by a wireless device 202, 204 at an access node 206, 208, 210. Gateway node 214 may assign, based on the specified QCI level, scheduling weights, admission thresholds, queue management thresholds, link layer protocol configurations, etc., to a dedicated bearer of the wireless device 202, 204, e.g., bearer profile. ARP values may be used to determine whether additional bearers may be established between wireless device 202, 204 and access node 206, 208, 208.

In another exemplary embodiment, a mobility profile of the wireless device 202, 204 can enable differential treatment for data traffic services with varying Quality of Service (QoS) requirements. For example, gateway node 214 may assign a bearer profile based on a determined mobility profile of the wireless device 202, 204. The mobility profile can comprise, for example, a distance covered by the wireless device 202, 204, wireless device 202, 204 historic usage information, wireless device 202, 204 connection history (e.g., a number of access nodes 206, 208, 210 that the wireless device 202, 204 was connected to over a period of time, cell reselection number, etc.), or a device profile. The device profile for wireless device 202, 204 may be established for a specific user account or may be based on a specific multi-play application requested by the wireless device 202, 204. Profile levels of the device profile may be based on calculations of data usage (e.g., tonnage) over the period of time (e.g., minutes, hours, days, weeks, months, etc.) or may be capped at a particular data rate.

In another exemplary embodiment, a bearer profile for a connected wireless device 202, 204, e.g., RCC_Connected, can be updated when a wireless device 202, 204 meets a condition threshold, e.g., QoE, QoS, loading at an access node 206, 208, 210, tonnage, data rate, etc. For example, a default bearer and dedicated bearer profiles, associated with a specific QCI level and ARP value, may be assigned by controller node 212 and/or gateway node 214 via access node 206, 208, 210 to wireless device 202, 204. The QCI level and ARP value of the default bearer profile is based on the subscription data of the wireless device 202, 204 when the wireless device 202, 204 initially attaches to access node 206, 208, 210, e.g., RCC_Connected mode. Additional dedicated bearer profiles, associated with a specific QCI level and ARP value, that provide dedicated tunnels to specific data traffic services, such as, VoIP, video, data, etc., may be assigned by gateway node 214 via access node 206, 208, 210 to wireless device 202, 204. Dedicated bearers may use traffic flow templates (TFT) to provide special treatment to specific data traffic services.

In another exemplary embodiment, controller node 212 may identify a wireless device, for example, wireless device 202, that is consuming large amounts of network resources, e.g., video. Controller node 212 may send a notification request to the wireless device 202 to update a profile for an existing dedicated bearer. For example, controller node 212 may instruct wireless device 202 to change a bearer profile, e.g., QCI level and ARP value associated with an existing dedicated bearer, to a different QCI level and lower ARP value. This reduces the amount of network resources being consumed by wireless device 202 and the delay for incoming bearer establishment request from wireless devices, for example, wireless device 204, having a higher ARP value than wireless device 202. In some instances, wireless device 202 may cancel the notification request sent by controller node 212 and the bearer profile for wireless device 202 is not updated until wireless device 202 goes into an idle mode. This results in a waste of network resources and may cause additional delay for wireless devices 204 requesting establishment for an incoming bearer which impacts QoE for the affected wireless device 204.

Figure 3:
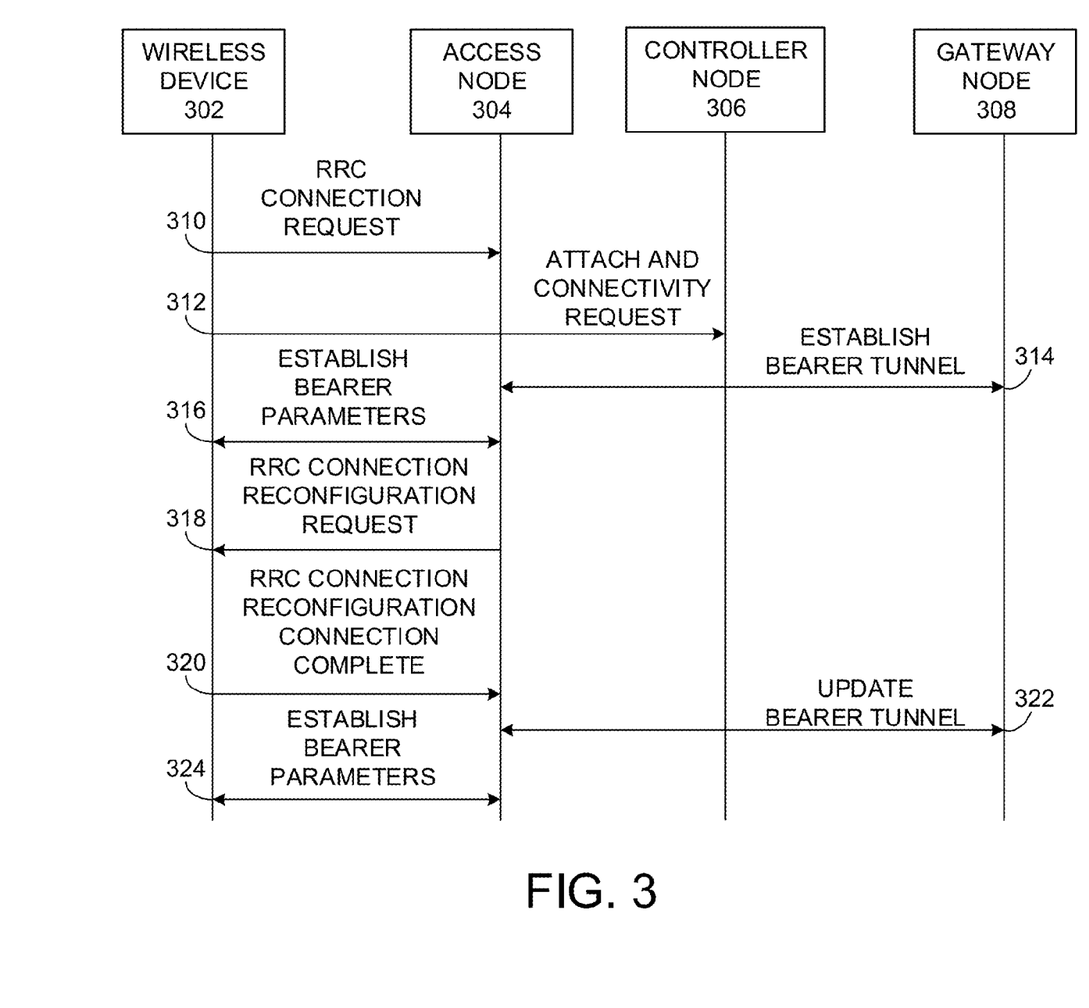
FIG. 3 illustrates a signaling diagram to illustrate a portion of an exemplary process for assigning a bearer profile to a wireless device operating in a communication network.

FIG. 3 illustrates a signaling diagram to illustrate a portion of an exemplary process for assigning a bearer profile to a wireless device operating in a wireless communication network. The portion of an exemplary process for assigning a bearer profile to a wireless device operating in a wireless communication network illustrated in FIG. 3 can be implemented in the exemplary communication system 100 illustrated in FIG. 1, in the exemplary communication system 200 illustrated in FIG. 2, or with any suitable communication system. In addition, although FIG. 3 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

Referring to FIG. 3, at step 310, a wireless device 302 may initially establish a communication link with access node 304 upon initialization or during a handover procedure, e.g., RRC_Connected, and assign a default bearer profile. Data addressed to the wireless device 302 may be communicated from a controller node 306 to the wireless device 302 via access node 304.

At steps 312 and 314, wireless device 302 sends an Attach Request message to controller node 306 to establish a dedicated bearer. The Attach Request message may include a subscriber identity associated with the wireless device 302 and a Connectivity Request message requesting connectivity on the established RRC_Connected communication link. Access node 304 may establish a logical connection, e.g., a dedicated bearer, with controller node 306 for wireless device 302.

At step 316, controller node 306 may establish parameters for a default or dedicated bearer for wireless device 302 at gateway node 308 based on application requirements of wireless device 302. In an exemplary embodiment, the controller node 306 may update a bearer profile of the wireless device 302 based on, for example, a location of the wireless device 302, data usage of the wireless device 302, or a subscriber profile of the wireless device 302.

For example, the controller node 306 may send a notification request to wireless device 302 to update the default or dedicated bearer profile based on, for example, monitored QoS parameters, e.g., QCI level, ARP value, GBR, MBR, tonnage, data usage, etc., associated with wireless device 302. In some instances, for example, when wireless device 302 is in active mode, the wireless device 302 may cancel the notification request sent by controller node 306. Consequently, the dedicated bearer for wireless device 302 will not be updated.

In another exemplary embodiment, gateway node 308 may monitor wireless device 302 for a configurable period of time (e.g., seconds, minutes, hours, days) to see if wireless device goes into an idle mode (this would force wireless device 302 to use the updated bearer profile). If the wireless device 302 stays in an active mode, e.g., does not go into an idle mode, the controller node 306 may instruct gateway node 308 to create an updated bearer profile based on the monitored QoS parameters e.g., QCI level, ARP value, GBR, MBR, tonnage, data usage, etc., associated with wireless device 302 and instruct access node 304 to detach wireless device 302 from the communication network.

At step 318, access node 304 may reconfigure network resources to wireless device 302 by sending an RRC_Connection Reconfiguration Request message to wireless device 302. In this message, access node 304 may piggy-back an activate bearer context request message to wireless device 302.

At step 320, wireless device 302 may update its RRC_Connection Configuration and sends an RRC_Connection Reconfiguration Complete message to access node 304.

At step 322, access node 304 may send an initial context setup response to controller node 306 and gateway node 308. Controller node 306 may modify the bearer request and notify gateway node 308 to update the user tunnel identity for the default or dedicated bearer. Gateway node 308 may notify controller node 306 to modify or update the bearer. Controller node 306 may send an Attach Accept message and Activate Bearer message to wireless device 302.

At step 324, wireless device 302 may process the Attach Accept message and Activate Bearer message and send an Attach Complete message to access node 304, e.g., wireless device 302 may accept the notification to update the bearer profile. Wireless device 302 may piggy-back an activate bearer context accept message on the Activate Bearer message and the Attach Complete message to the controller node 306 and gateway node 308.

Figure 4:
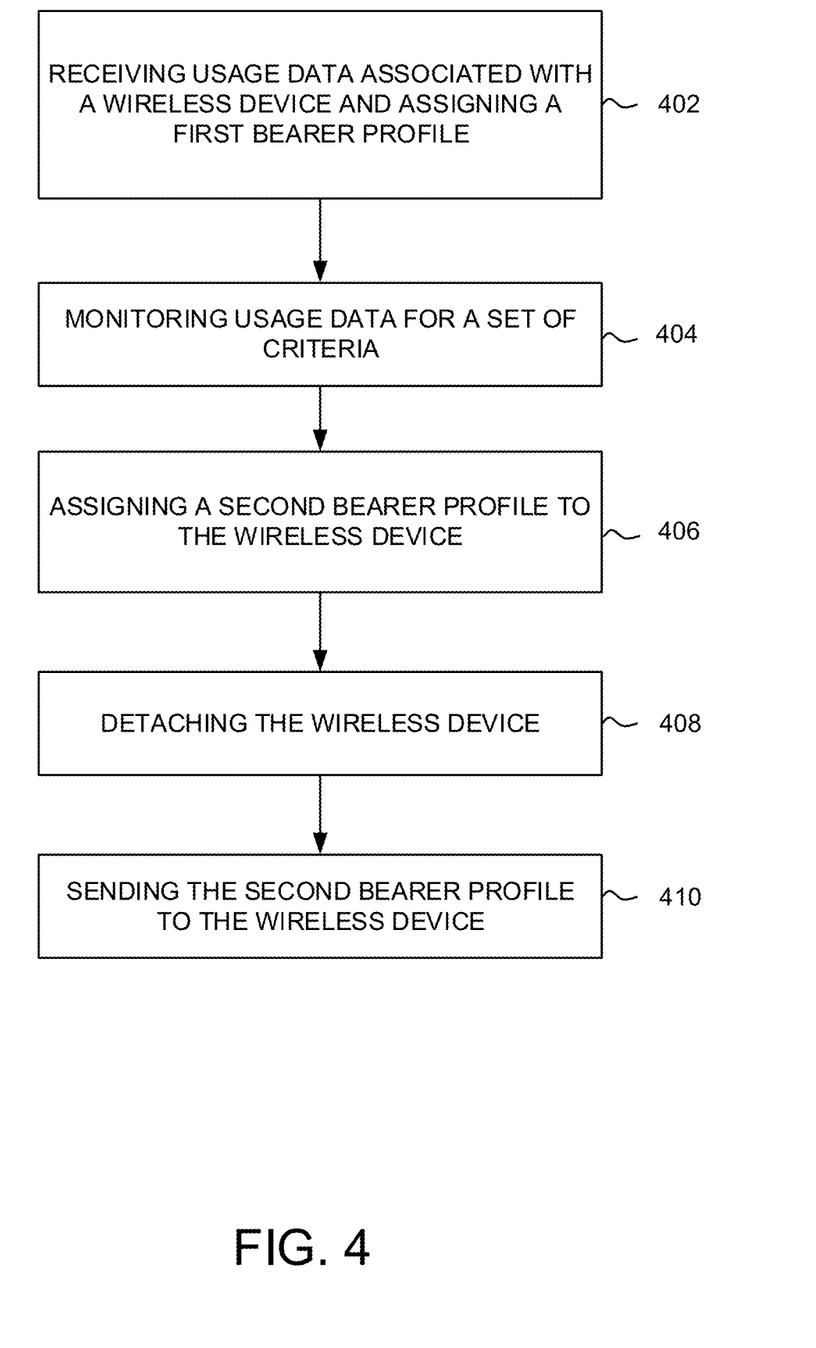
FIG. 4 illustrates an exemplary method for assigning a bearer profile to a wireless device operating in a communication network.

FIG. 4 illustrates a flow chart of an exemplary method for assigning a bearer profile to a wireless device operating in a wireless communication network. The method will be discussed with reference to the exemplary communication system 200 illustrated in FIG. 2. However, the method can be implemented in the exemplary communication 100 illustrated in FIG. 1, in the signaling diagram of a portion of an exemplary process for assigning a bearer profile to a wireless device illustrated in FIG. 3, and with any suitable communication system. In addition, although FIG. 4 depicts steps performed in a particular order for purposes of illustration and discussion, the methods discussed herein are not limited to any particular order or arrangement. One skilled in the art, using the disclosure provided herein, will appreciate that various steps of the methods can be omitted, rearranged, combined and/or adapted in various ways.

Referring to FIG. 4, at step 402, a network node can receive usage data associated with a wireless device and assign a first bearer profile. For example, in an exemplary embodiment, when a wireless device 202 initially establishes communication with access node 208, e.g., upon initialization or during a handover procedure, a request to establish a first communication link between the access node 208 and gateway node 214 can be transmitted to controller node 212. After the first communication link is established, data addressed to wireless device 202 can be communicated from controller node 212 to wireless device 202, e.g., RCC_Connected mode. In RRC_Connected mode, access node 208 is configured to constantly measure and monitor via controller node 212 usage data associated with wireless device 202. Controller node 212 may assign a first bearer profile, e.g., a QCI level and ARP value associated with a dedicated bearer, via gateway node 214 between access node 208 and wireless device 202 based on the monitored usage data associated with wireless device 202.

At step 404, a network node can monitor the usage data for a set of criteria for a period of time. For example, in an exemplary embodiment, access node 208 can constantly measure and monitor via controller node 212 QoS parameters, for example, QCI level, ARP value, GBR, MBR, associated with the first bearer profile between access node 208 and wireless device 202 for a period of time and may assign, for example, scheduling weights, admission thresholds, queue management thresholds, link layer protocol configurations, etc., to the first bearer profile of wireless device 202.

At step 406, a network node can assign a second bearer profile to a wireless device when the set of criteria is met. In an exemplary embodiment, a bearer profile for a connected wireless device 202, e.g., RCC_Connected, can be updated when a wireless device 202 meets a condition threshold. For example, a second bearer profile, associated with QoS parameters, e.g., QCI level, ARP value, GBR, MBR, that were monitored at access node 208 over the period of time may be assigned by controller node 212 via gateway node 214 and access node 208 when the QoS parameters exceed at least one of a predetermined scheduling weight, admission threshold, queue management threshold, link layer protocol configuration, assigned to the first bearer profile of wireless device 202. In another exemplary embodiment, the second bearer profile has a lower QCI level and ARP value than the first bearer profile assigned to wireless device 202.

At step 408, a wireless device may be detached from the communication network. For example, in an exemplary embodiment, the controller node 212 via access node 208 may send a notification request to wireless device 202 and instruct the wireless device 202 to update the first bearer profile to the second bearer profile based on the monitored QoS parameters e.g., QCI level, ARP value, GBR, MBR, associated with wireless device 202. In some instances, in an active mode, the wireless device 202 may cancel the notification request sent by controller node 212. Consequently, the first bearer profile for wireless device 202 will not be updated.

In another exemplary embodiment, the controller node 212 via access node 208 may stop sending the notification request to update the first bearer profile to the second bearer profile. For example, controller node 212 may monitor wireless device 202 for a configurable period of time to see if wireless device 202 goes into an idle mode (this would force the wireless device 202 to use the second bearer profile). If the wireless device 202 stays in an active mode, e.g., does not go into an idle mode, the controller node 212 may instruct gateway node 212 to create the second bearer profile based on the monitored QoS parameters, e.g., QCI level, ARP value, GBR, MBR, associated with wireless device 202 and instruct access node 208 to detach wireless device 202 from the communication network.

At step 410, a network node may send a second bearer profile to a wireless device. In an exemplary embodiment, once controller node 212 has instructed access node 208 to detach wireless device 202 from the communication network, controller node 212 may trigger a network re-attach. For example, controller node 212 may instruct access node 208 to re-attach wireless device 202 to the communication network using the second bearer profile.

In another exemplary embodiment, if the mobility of wireless device 202 leads to controller node 212 change, controller node 212 may include a mechanism to notify a new controller node (not shown) regarding the wireless device 202 bearer profile change and current period of time values so that appropriate action can be taken when the period of time expires.

Figure 5:
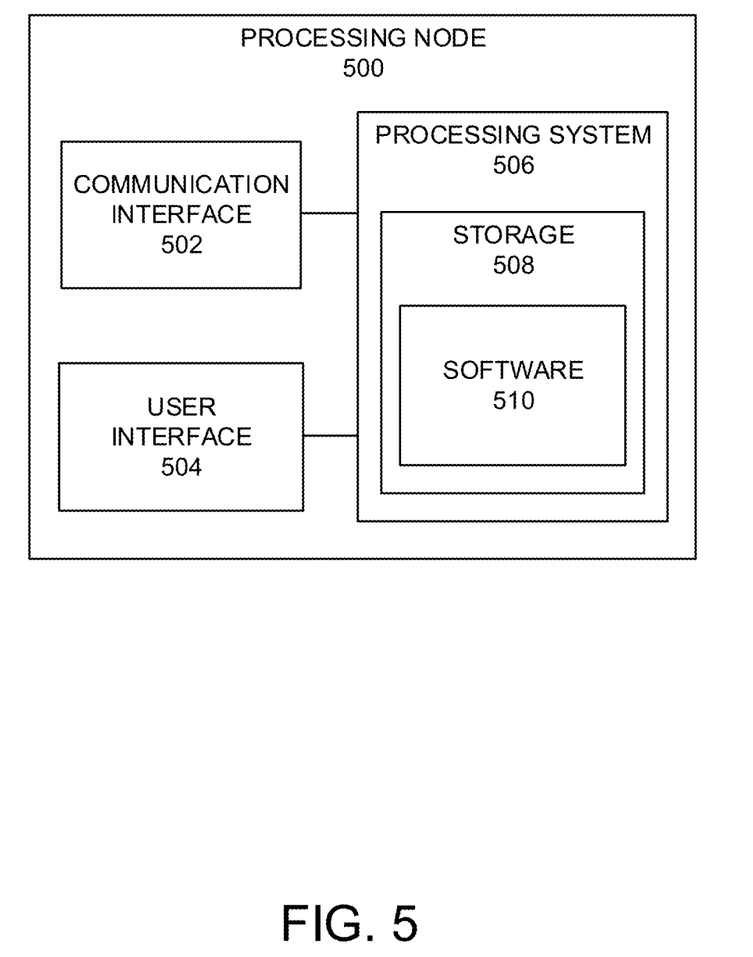
FIG. 5 illustrates an exemplary processing node.

FIG. 5 illustrates an exemplary processing node 500 in a communication system. Processing node 500 comprises communication interface 502, user interface 504, and processing system 506 in communication with communication interface 502 and user interface 504. Processing node 500 can be configured to determine a communication access node for a wireless device. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples of processing node 500 include access nodes 106, 206, 208, 210, 304, gateway nodes 214, 308, and controller nodes 212, 306. Processing node 500 can also be an adjunct or component of a network element, such as an element of access nodes 106, 206, 208, 210, 304, gateway nodes 214, 308 and controller nodes 212, 306. Processing node 500 can also be another network element in a communication system. Further, the functionality of processing node 500 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for assigning a profile to a wireless device in a communication network, the method comprising:
receiving usage data associated with an active wireless device at a first access node and assigning a first bearer profile to a data transmission path;
monitoring the usage data for a set of criteria for a predetermined period of time;
assigning a second bearer profile to the data transmission path based on the usage data associated with the active wireless device when the set of criteria is met;
sending a notification request to the active wireless device instructing the wireless device to re-attach to the communication network using the second bearer profile; and
when the active wireless device cancels the notification request:
detaching the active wireless device from the communication network, and
re-attaching the active wireless device to the communication network using the second bearer profile.

2. The method of claim 1, wherein the set of criteria are Quality of Service (QoS) parameters.

3. The method of claim 2, wherein the QoS parameters include at least one of QoS Class Indicator (QCI) level, an Allocation and Retention Priority (ARP) value, Guaranteed Bit Rate (GBR), and Maximum Bit Rate (MBR).

4. The method of claim 3, further comprising enabling differential treatment for data traffic services associated with the usage data of the wireless device based on a specific QCI level and ARP value.

5. The method of claim 3, wherein the QoS parameters exceed at least one of a predetermined scheduling weight, admission threshold, queue management threshold, link layer protocol configuration, assigned to the first bearer profile of the wireless device.

6. A system for assigning a profile to a wireless device in a communication network, the system comprising:
a controller node configured to:
receive usage data associated with an active wireless device at a first access node and assign a first bearer profile to a data transmission path;
monitor the usage data for a set of criteria for a predetermined time period;
assign a second bearer profile to the data transmission path based on the usage data associated with the active wireless device when the set of criteria is met;
send a notification request to the active wireless device instructing the wireless device to re-attach to the communication network using the second bearer profile; and
when the active wireless device cancels the notification request:
detach the active wireless device from the communication network, and
re-attach the active wireless device to the communication network using the second bearer profile.

7. The system of claim 6, wherein the set of criteria are Quality of Service (QoS) parameters.

8. The system of claim 7, wherein the QoS parameters include at least one of QoS Class Indicator (QCI) level, an Allocation and Retention Priority (ARP) value, Guaranteed Bit Rate (GBR), and Maximum Bit Rate (MBR).

9. The system of claim 8, further comprising enabling differential treatment for data traffic services associated with the usage data of the wireless device based on a specific QCI level and ARP value.

10. The system of claim 8, wherein the QoS parameters exceed at least one of a predetermined scheduling weight, admission threshold, queue management threshold, link layer protocol configuration, assigned to the first bearer profile of the wireless device.

11. A system for updating a profile of a wireless device in a communication network, the system comprising:
   a controller node configured to:
      assign a first bearer profile to an active wireless device based on monitored usage data associated with the active wireless device;
      assign a second bearer profile to the active wireless device when the monitored usage data meets set criteria;
      send one or more notification requests to the active wireless device instructing the active wireless device to update from the first bearer profile to the second bearer profile;
      stop sending the notification request on receipt of a canceled notification request from the active wireless device;
      detach the active wireless device from the communication network; and
      re-attach the active wireless device to the communication network using the second bearer profile.

12. The system of claim 11, wherein the second bearer profile is based on monitored Quality of Service (QoS) parameters associated with the wireless device.

13. The system of claim 12, wherein the monitored QoS parameters include at least one of QoS Class Indicator (QCI) level, an Allocation and Retention Priority (ARP) value, Guaranteed Bit Rate (GBR), and Maximum Bit Rate (MBR) associated with the wireless device.

14. The system of claim 11, wherein the controller node is further configured to:
   monitor an operating mode of the wireless device for a configurable period of time, the operating mode being one of an active mode or an idle mode; and
   create the second bearer profile when the operating mode of the wireless device is active after the configurable period of time expires.

* * * * *